United States Patent [19]

Bagga et al.

[11] Patent Number: 4,701,378

[45] Date of Patent: Oct. 20, 1987

[54] BONDING PROCESS USING CURABLE EPOXIDE RESIN ADHESIVE

[75] Inventors: Madan M. Bagga, Cambridge; Christopher H. Bull, Trumpington, both of England

[73] Assignee: Ciba-Geigy Corporation, Ardsley, N.Y.

[21] Appl. No.: 847,365

[22] Filed: Apr. 2, 1986

[30] Foreign Application Priority Data

Apr. 2, 1985 [GB] United Kingdom ............... 8508628

[51] Int. Cl.$^4$ ........................... B05D 1/36; C09J 5/02
[52] U.S. Cl. ............................. 428/414; 156/307.3; 156/330; 525/486; 528/120
[58] Field of Search ..................... 525/486; 528/120; 428/414; 156/330, 307.3

[56] References Cited

U.S. PATENT DOCUMENTS

| | | | |
|---|---|---|---|
| 3,200,172 | 8/1965 | Renner | 525/486 |
| 3,383,433 | 5/1968 | Salensky | 525/486 |
| 3,420,794 | 1/1969 | May et al. | 528/120 |
| 3,519,576 | 7/1970 | Johnson . | |
| 3,520,905 | 7/1970 | Johnson . | |
| 3,839,281 | 10/1974 | Dreher | 525/486 |
| 4,066,625 | 1/1978 | Bolger | 528/120 |

OTHER PUBLICATIONS

Derwent Abstract 85-046905/08.
Derwent Abstract 85-046906/08.
Derwent Abstract 85-046907/08.

Primary Examiner—John J. Gallagher
Attorney, Agent, or Firm—Luther A. R. Hall

[57] ABSTRACT

Adhesion between surfaces of metal, reinforced plastics, glass, friction material or ceramics is effected using an adhesive comprising (a) an epoxide resin (b) a nitrogen-containing latent curing agent for this resin, such as dicyandiamide, isophthalic acid dihydrazide or adipic acid dihydrazide, and (c) as accelerator for the cure, and dispersed as a powder in (a) and (b), a solid solution of a nitrogen base having a boiling point above 130° C. and a phenol-aldehyde resin.

Typical nitrogen bases used in (c) include benzyldimethylamine, benzimidazole and 2-methylimidazole. Typical phenolic resins are those prepared from phenol and formaldehyde.

20 Claims, No Drawings

BONDING PROCESS USING CURABLE EPOXIDE RESIN ADHESIVE

This invention relates to a method of bonding two surfaces together using a curable epoxide resin adhesive.

The use of epoxide resins as adhesives and coatings has been commercial practice for several decades. Many hardeners are reactive at room temperature and so need to be mixed with the epoxide resin just prior to use. Others are stable in admixture with the epoxide resin at room temperature, and start to harden only when heated above a certain 'threshold temperature'. These hardeners, the so-called 'latent hardeners', are available commercially and include a number of chemically different types, such as polycarboxylic acid hydrazides, aminotriazines, boron trifluoride complexes, boron trichloride-tertiary amine complexes, polyphenols, polycarboxylic acids, dicyandiamide, imidazoles, and organic metal compounds.

Compositions containing an epoxide resin and a latent hardener generally take 15 minutes to 1 hour to cure at temperatures of about 180° C. Cure times can be shortened by incorporation of latent accelerators which have little effect on storage stability at ambient temperatures but which enable solidification of the mixture to take place within about 30 minutes at 120° C. For instance, if dicyandiamide is used as the hardener, an accelerator is often used that is a substituted phenylurea, such as N-(4-chlorophenyl)-N',N'-dimethylurea. A more rapid solidification of such mixtures may be obtained by heating to a higher temperature but, at temperatures of around 200° C., this type of accelerator evolves volatiles which cause bubbling in the hardening mixture. The presence of such bubbles in a glue line is obviously a very serious drawback, since any bond so affected is much weaker than one formed with no bubbles. Similarly a bubbled mixture could not be used to prepare satisfactory coatings or laminates. It is therefore common practice to cure such mixtures at temperatures below about 150° C., at which temperature solidification takes about 5 minutes.

There is a desire in some sections of the automobile industry to replace spot welding of some components by adhesive bonding. In order to compete with welding, an adhesive is required that is capable of solidifying within a few seconds at high temperature and which will give a cured product of high joint strength. In order to maintain production line speed it is essential that components to be joined are heated rapidly. Induction heating is a very rapid heating method, giving high temperatures within a few seconds. However, if such a heating method is used, fine control over the temperature is often difficult because of the geometry of the assembly. Accelerators that cause bubbling at high temperature are therefore unsuitable.

Epoxide resins form bonds of very high strength, and would be suitable for the bonding of automobile components except that conventional formulations suffer from one or more of the following drawbacks: insufficient stability on ambient temperature storage, insufficient rapidity of hardening when heated, and formation of bubbles at high curing temperatures. It has now been found that these drawbacks can be overcome, and bonding together of certain substrates effected very rapidly at temperatures in the region of 180°–200° C. without formation of bubbles, by use of a combination of an epoxide resin, a nitrogen-containing latent curing agent, particularly one containing amino-, imino, amido, imido, triazino-, or hydrazide groups and, as accelerator, a solid solution of a polymeric phenol with a high-boiling basic nitrogen compound, as hereinafter defined.

The use of phenol-amine salts as latent curing agents for epoxide resins is well known, having been described in, for example, U.S. Pat. Nos. 3,519,576 and 3,520,905. In these patents there are described crystalline polyphenate salts of a polyamine and a polyhydric phenol. Suitable polyamines may contain any combination of primary, secondary, or tertiary aliphatic or aromatic amino groups. Polyamines that, when used separately, give rapid cure of epoxide resins at room temperature such as 1,3-propanediamine, ethylenediamine, and triethylenetetramine are preferred. The polyhydric phenols mentioned include resorcinol, bisphenol A, 4,4'-dihydroxybiphenyl, and 2,4,4-trimethyl-2',4',7-trihydroxyflavan. The use of these salts as accelerators for the cure of epoxide resins is not disclosed.

Japanese Kokais 60-4523 abd 60-4523 describe insulating pastes containing a heat-conductive filler, an epoxy resin, dicyandiamide as hardener and, as accelerator, a tertiary amine salt of a polyhydric phenol or polybasic acid. Kokai 60-4522 describes similar insulating pastes in which the hardener is a polyhydric phenol, a polycarboxylic acid or an aromatic polyamine. The Kokais suggest that the polyhydric phenol component of the salt might be a low molecular weight novolak.

(i) This invention provides a method of effecting adhesion between two surfaces selected from metals, reinforced plastics, glass, friction materials and ceramics which comprises
(i) applying to one or both surfaces a curable composition comprising
(a) an epoxide resin
(b) a nitrogen-containing latent curing agent for the epoxide resin and
(c) as accelerator for the cure and dispersed as a powder in a mixture of (a) and (b), a solid solution of a nitrogen base having a boiling point above 130° C., preferably above 150° C., and a polymeric phenol which is a condensation product of a phenol with an aldehyde,
(ii) placing the two surfaces together with the composition positioned therebetween to form an asssembly, and
(iii) heating the assembly until the composition solidifies.

The term 'solid solution' as used with reference to component (c), is intended to indicate a combination of the nitrogen base and the polymeric phenol in a single solid phase. It is possible that there is some salt formation between the two components. It is also possible that there is hydrogen bonding between them. Such solid solutions are not usually made using stoichiometric quantities of the components and so they will usually contain one component in excess of the other. The term 'solid solution' covers all such products, whether containing salts of the base and the phenol and whether containing an excess of either component.

Epoxide resins (a) which may be employed in the new compositions are preferably those containing at least two groups of formula

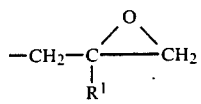

directly attached to an atom or atoms of oxygen, nitrogen, or sulphur, where $R^1$ denotes a hydrogen atom or a methyl group.

As examples of such resins may be mentioned polyglycidyl and poly(beta-methylglycidyl)esters obtainable by reaction of a compound containing two or more carboxylic acid groups per molecule with epichlorohydrin, glycerol dichlorohydrin, or beta-methylepichlorohydrin in the presence of an alkali. Such polyglycidyl esters may be derived from aliphatic polycarboxylic acids, e.g., oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(beta-methylglycidyl)ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene)-glycols, propane-1,2-diol and poly(oxypropylene)-glycols, propane-1,3-diol, butane-1,4-diol, poly(oxytetramethylene)glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quinitol, bis(4-hydroxycyclohexyl)methane, 2,2-bis(4-hydroxycyclohexyl)-propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. They may also be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl)sulphone, 1,1,2,2-tetrakis(4-hydroxyphenyl)ethane, 2,2-bis(4-hydroxyphenyl)-propane, 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenyl, 2-methylphenol, and 4-tert.butylphenol.

Poly(N-glycidyl) compounds include, for example, those obtained by dehydrochlorination of the reaction products of epichlorohydrin with amines containing at least two aminohydrogen atoms, such as aniline, n-butylamine, bis(4-aminophenyl)methane, m-xylylenediamine, and bis(4-methylaminophenyl)methane; triglycidyl isocyanurate; and N,N'-diglycidyl derivatives of cyclic alkylene ureas, such as ethyleneurea and 1,3-propyleneurea, and of a hydantion such as 5,5-dimethylhydantion.

Examples of poly(S-glycidyl) compounds are di-S-glycidyl derivatives of dithiols such as ethane-1,2-dithiol and bis(4-mercaptomethylphenyl)ether.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantion, and 2-glycidyloxy-1,3-bis(5,5-dimethyl-1-glycidylhydantion-3-yl)propane.

If desired, a mixture of epoxide resins may be used.

Preferred epoxide resins are liquids, and include polyglycidyl ethers, polyglycidyl esters, N,N'-diglycidylhydantions, and poly(N-glycidyl) derivatives of aromatic amines. Specific preferred resins are polyglycidyl ethers of 2,2-bis(4-hydroxyphenyl)-propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)phenyl)methane, and p-(diglycidylamino)phenyl glycidyl ether.

The nitrogen-containing latent curing agent (b) used in the adhesives may be any substance that remains inert towards epoxide resins below a certain 'threshold' temperature, which is usually at least 80° C., and preferably 100° C. or above, but reacts rapidly to effect curing once that threshold temperature has been exceeded. Such materials are well known and commerically available and include boron trichloride/amine and boron trifluoride/amine complexes, dicyandiamide, melamine, diallylmelamine, guanamines such as acetoguanamine and benzoguanamine, aminotriazoles such as 3-amino-1,2,4-triazole, hydrazides such as adipic dihydrazide, stearic dihydrazide, isophthalic dihydrazide, semicarbazide, cyanoacetamide, and aromatic polyamines such as diaminodiphenyl sulphones. The use of dicyandiamide, isophthalic acid dihydrazide and adipic acid dihydrazide is particularly preferred.

The solid solution (c) used as accelerator in the adhesives is prepared and powdered prior to admixture with the resin (a) and curing agent (b). If the solid solution (c) is not prepared prior to admixture with the resin and curing agent, but an attempt is made to prepare it in situ in the epoxy resin, a storage-stable mixture is not obtained.

The polymeric phenols used to prepare the solid solutions (c) are materials having more than two repeating units having at least one phenolic hydroxyl group per unit. Such phenols may be prepared by condensation of a monomeric phenol with an aldehyde. Typical condensation polymers are novolaks prepared from a phenol, including monohydric phenols such as phenol itself, alkyl or alkoxyphenols, halogenated phenols, and dihydric phenols such as resorcinol or bisphenol A, the preferred phenols being phenol itself, p-tert.butylphenol and bisphenol A, with an aldehyde such as furfuraldehyde, chloral, acetaldehyde or, preferably, formaldehyde. Such novolaks are preferably of the general formula

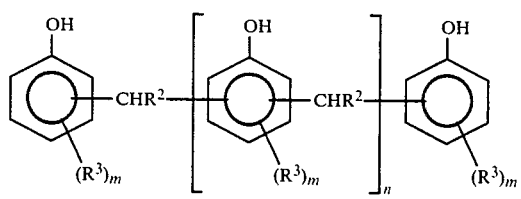

where
R² represents a hydrogen atom or an alkyl, aryl, or heterocyclyl group,
R³ represents a halogen atom or a hydroxyl, alkyl, alkoxy, aryl, aralkyl, or hydroxyaralkyl group,
m represents zero or an integer of from 1 to 3, and
n represents an integer having an average value that is within the range 1 to 15.

Preferred polymeric phenols of formula II are those wherein R² represents hydrogen, R³ represents an alkyl r hydroxyaralkyl group, and m represents zero or 1, particularly novolaks prepared from phenol, a cresol, p-tert.butylphenol or bisphenol A, with formaldehyde.

The nitrogen bases used to make the solid solutions (c) may be primary, secondary or tertiary amines or basic nitrogen-containing heterocycles such as imidazoles. Thus suitable bases include tertiary monoamines, secondary monoamines, primary diamines, secondary diamines, tertiary diamines, tertiary triamines, mixed polyamines and nitrogen heterocycles. Examples of suitable bases having a boiling point, at atmospheric pressure, above 130° C. are tertiary monoamines such as 2-(N,N-dimethylamino)ethanol, secondary monoamines such as di-isobutylamine, primary diamines such as 1,3-diaminopropane and 1,3-diaminobutane, secondary diamines such as piperazine, mixed polyamines such as 3-(dimethylamino)propylamine, and nitrogen heterocycles such as 3-methylpyridine or 4-methylpyridine.

Preferred bases are those having a boiling point, at atmospheric pressure, above 150° C. Examples of such preferred bases are tertiary monoamines such as tri-n-butylamine, triisobutylamine, octyldimethylamine, benzyldimethylamine, tri-n-propylamine, trihexylamine, N,N-diethylcyclohexylamine, 2-(diethylamino)ethanol, 3-(dimethylamino)-1-propanol, and 2-(dimethylaminomethyl)phenol; secondary monoamines such as 2-(methylamino)ethanol, di-n-amylamine and di-isoamylamine; primary diamines such as isophorone diamine (5-aminoethyl-3,3,5-trimethylcyclohexylamine), 1,4-diaminobutane, 1,5-diaminopentane and hexamethylene diamine; secondary diamines such as N,N'-diethylethylenediamine; tertiary diamines such as N,N,N', N'-tetramethylbutanediamine, 1,7-bis(dimethylamino)heptane and bis(4-dimethylaminophenyl)methane; tertiary triamines such as 2,4,6-tris(dimethylaminomethyl)phenol; mixed polyamines such as triethylenetetramine, tetraethylenepentamine, diethylenetriamine, 3-(diethylamino)propylamine, and N-(2-aminoethyl)piperazine; and nitrogen heterocycles such as 1-methylimidazole, 2-methylimidazole, benzimidazole, 2-phenylimidazole and quinoline.

Particularly preferred bases are benzyldimethylamine, 2-(dimethylaminomethyl)phenol, 2,4,6-tris(dimethylaminomethyl)phenol, 2-methylimidazole, benzimidazole, 2-phenylimidazole, and N-(2-aminoethyl)piperazine.

The solid solution may be prepared by heating the polymeric phenol and the nitrogen base together, either in the absence of a solvent or in a lower alcohol, particularly methanol, until a clear liquid is obtained, and then evaporating any solvent present. Usually no further purification is necessary. The weight ratio of polyphenol to nitrogen base must be such as to give a solid, stable product and is generally within the range 0.8–4.0:1, especially 1.0–3.0:1. It will be appreciated that such ratios are not necessarily stoichiometric and, since generally no attempt is made to purify the products, they usually comprise mixtures. This fact is in no way deleterious to the successful utilisation of the solid solutions in the method of the invention.

The amount of latent curing agent (b) used in the method of the present invention is not critical and will be that amount used conventionally for the particular curing agent and epoxide resin. Such amounts are well known by those familiar with the formulation of epoxide resin systems. As a guide, the amount of curing agent is generally within the range 1 to 30 parts by weight, especially 5 to 10 parts by weight, per 100 parts by weight of the epoxide resin (a).

The amount of the accelerator (c) used in the present method is also not critical, provided sufficient is present to give an accelerating effect. Generally amounts within the range 0.1 to 10%, and especially 0.5 to 5% by weight of the eppoxide resin (a), are used.

The curable adhesive composition may be applied in a conventional manner to one or both of the surfaces to be bonded. The surfaces may then be brought together as in conventional bonding processes and the resulting assembly heated to effect cure of the adhesive composition. Temperatures within the range 150°–220° C. are preferred, especially 175°–200° C., such that solidification occurs within a period of 5 seconds to 10 minutes, especially 10 seconds to 5 minutes.

The method of the invention may be used to bond surfaces of metal, such as steel or aluminium, reinforced thermoplastic or thermoset resinous materials, glass, friction materials such as brake linings, and ceramic materials. It is particularly useful where both surfaces are of metal. The phrase "effecting adhesion between two surfaces" as used herein includes sealing a space between two surfaces.

Additives that may be incorporated into the adhesive compositions in order to improve their physical or chemical properties in the cured or uncured state include for example pigments, dyes, flexibilisers, plasticisers, fillers, thixotropic agents, and fire retardants.

The invention will now be illustrated by reference to the following Examples in which all parts are by weight. The accelerators used in these Examples are prepared as follows:

Accelerator I

A novolak, prepared from phenol and formaldehyde in the molar ratio 1:0.89, and melting in the range 70°–90° C. (10 g) is mixed with benzyldimethylamine (4.2 g) and heated slowly to 150° C. It is kept at this temperature for ½ hour, then poured into an aluminium tray, allowed to cool, and the resultant brown, brittle solid is ground to a powder.

Accelerator II

The process used to make Accelerator I is repeated, except that the amine used in that process is replaced by N-aminoethylpiperazine (4.5 g). Accelerator II is a brown, brittle solid that is ground to a powder.

Accelerator III

A novolak prepared from bisphenol A and formaldehyde in the molar ratio 1:0.85, and melting in the range 125°–132° C. (10 g) is mixed with benzyldimethylamine (3.7 g) and heated slowly to 150° C. It is kept at this temperature for about ½ hour, then poured into an aluminium tray and allowed to cool. The resultant brown brittle solid is ground to a powder.

Accelerator IV

A novolak, prepared from phenol and formaldehyde in the molar ratio 1:0.89, and melting in the range 70°–90° C. (40 g) is melted at 110° C. and 2-phenylimidazole (20 g) added portionwise with stirring. The temperature of the reaction mixture is raised to 150° C. and held at this temperature for 15 minutes. The clear melt is then poured into an aluminium tray where it solidifies to a solid that is ground to a fine powder.

Accelerator V

The novolak used to prepare Accelerator IV (150 g) is dissolved in methanol (200 ml) at 50° C. and benzimidazole (75 g) added with stirring. This mixture is stirred for a further 15 minutes at 50° C. Methanol is removed by distillation at atmospheric pressure and the temperature in the reaction vessel is allowed to rise to 160° C., last traces being removed under a pressure of 400 mm. Hg at 160° C. The reaction mixture is held for a further 90 minutes at 160° C. and then poured into aluminium trays where it solidifies to a brittle solid that is ground to a fine powder.

Accelerator VI

The novolak used in the preparation of Accelerator IV (120 g) is dissolved in methanol (200 ml) at 50° C. and 2-(dimethylaminomethyl)phenol (90 g) is added dropwise and with stirring. This mixture is stirred for a further 15 minutes at 50° C. Methanol is removed by distillation at atmospheric pressure and the temperature in the reaction vessel allowed to rise to 140° C., last traces being removed under a pressure of 400 mm. Hg at 140° C. and maintaining these conditions for 30 minutes. The hot mixture is poured into aluminium trays where it cools to a brittle solid which is ground to a fine powder.

Accelerator VII

A novolak prepared from p-tert.butyl phenol and formaldehyde having a weight average molcular weight of 812 melting at 112° C. (100 g) is dissolved in methanol (200 ml) and reacted with 2,4,6-tris(dimethylaminomethyl)phenol (55.5 g) by the procedure described for Accelerator VI to obtain a brittle yellow solid which is ground to a fine powder.

Accelerator VIII

A novolak prepared from bisphenol A and formaldehyde in the molar ratio 1:0.46 and melting at 90° C. (12 g) is mixed with 2,4,6-tris(dimethylaminomethyl)phenol (6.7 g) to obtain a slurry. This slurry is heated with mixing to 140° C. and during this time the novolak dissolves in 2,4,6-tris(dimethylaminomethyl)phenol to form a clear melt. This is held for a further 15 minutes at 140° C. and poured into an aluminium tray where it solidifies to a brittle light yellow solid. This is ground to a fine powder.

Accelerator IX

A novolak, prepared from phenol and formaldehyde in the molar ratio 1:0.89, and melting in the range 70°–90° C. (72 g) is mixed with 2-methylimidazole (32 g) and heated slowly to 140° C. It is kept at this temeprature for 30 minutes, then poured into an aluminium tray, allowed to cool, and the resultant brown, brittle solid is ground to a powder.

Accelerator X

A novolak prepared from p-tert.-butylphenol and formaldehyde having a weight average molecular weight of 1253 and melting at 139° C. (4.89 g) is mixed with benzyldimethylamine (1.35 g) and heated slowly to 150° C. It is kept at this temperature for 10 minutes, then poured into an aluminium tray, allowed to cool, and the resultant yellow, brittle solid is ground to a powder.

STABILITY AND CURE TESTS

TEST 1

A diglycidyl ether of bisphenol A, having an epoxide content of 5.2 equivalents/kg (100 parts) is mixed with dicyandiamide (7.5 parts), highly-dispersed silica (5.0 parts) and Accelerator I (3.4 parts). This mixture is stable for over 12 weeks at 40° C. A sample of this mixture is placed on a steel hotplate heated at 180° C. Solidification occurs within 2.2 minutes.

When a layer of the mixture 2 mm thick containing added talc (60 parts) is heated rapidly to 200° C. there is no evidence of bubble formation.

TEST 2

Test 1 is repeated, using 6.8 parts of Accelerator I. Solidification occurs within 1.0 minute and the mixture is stable for over 12 weeks at 40° C.

TEST 3

Test 1 is repeated, replacing the accelerator used in that Test by Accelerator II (4.0 parts). Solidification occurs within 3.6 minutes at 180° C. and the mixture is stable for over 4½ months at 40° C.

TEST 4

Test 1 is repeated, replacing the accelerator used in that Test by Accelerator III (7.4 parts). Solidification occurs within 0.6 minute at 180° C. and the mixture is stable for 2–3 weeks at 40° C. and for over 6 months at 23° C.

TEST 5

The epoxide resin described in Test 1 (100 parts) is mixed with isophthalic acid dihydrazide (25.2 parts) and Accelerator I (5.6 parts). A sample of this mixture is placed on a hotplate at 180° C. Solidification occurs after 0.7 minute and the mixture is stable for 3–4 months at 40° C.

TEST 6

Test 5 is repeated, replacing the accelerator used in that Test by Accelerator IV (3.0 parts). Solidification occurs within 1.0 minute at 180° C. and the mixture is stable for 6–7 days at 40° C. When a 2 mm thick layer of the mixture containing added talc (60 parts) is heated rapidly to 200° C., there is no evidence of bubble formation.

TEST 7

Test 1 is repeated, replacing the accelerator used in that Test by Accelerator VI (4.6 parts). Solidification occurs within 0.9 minute at 180° C. and the mixture is stable for more than 5 weeks at 40° C. When a 2 mm thick layer of the mixture containing added talc (60 parts) is heated rapidly to 200° C., there is no evidence of bubble formation.

TEST 8

Test 1 is repeated, replacing the accelerator used in that Test by Accelerator VII (2.8 parts). Solidification occurs within 0.7 minute at 180° C. and the mixture is stable for 8-9 days at 40° C. When a 2 mm thick layer of the mixture containing added talc (60 parts) is heated rapidly to 200° C., there is no evidence of bubble formation.

TEST 9

Test 1 is repeated, replacing the accelerator used in that Test by Accelerator IX (3.2 parts). Solidification occurs within 0.5 minute at 180° C. and the mixture is stable for more than 5 weeks at 40° C. When a 2 mm thick layer of the mixture containing added talc (60 parts) is heated rapidly to 200° C., there is no evidence of bubble formation.

TEST 10

Test 1 is repeated, replacing the accelerator used in that Test by Accelerator X (4.0 parts). Solidifcation occurs within 1.8 minutes at 180° C. and the mixture is stable for 4 weeks at 40° C. When a 2 mm thick layer of the mixture containing added talc (60 parts) is heated rapidly to 200° C., there is no evidence of bubble formation.

TEST 11

Test 1 is repeated, replacing the dicyandiamide by adipic acid dihydrazide (23.1 parts) and replacing the accelerator by Accelerator V (3.0 parts). Solidification occurs within 0.8 minute at 180° C. and the mixture is stable for 4 weeks at 40° C. When a 2 mm thick layer of the mixture containing added talc (60 parts) is heated rapidly to 200° C., there is no evidence of bubble formation.

TEST 12

Test 11 is repeated, replacing the accelerator used in that Test by Accelerator VIII (2.8 parts). Solidification occurs within 0.8 minute at 180° C. and the mixture is stable for more than 5 weeks at 40° C. When a 2 mm thick layer of the mixture containing added talc (60 parts) is heated rapidly to 200° C., there is no evidence of bubble formation.

EXAMPLE 1

A composition is prepared containing

| | |
|---|---|
| epoxide resin | 100 parts |
| dicyandiamide | 7.5 parts |
| highly dispersed silica | 5.0 parts |
| glass microspheres | 1.0 part |
| Accelerator I | 6.8 parts |

The epoxide resin used is a diglycidyl ether of bisphenol A having an epoxide content of 5.2 equivalents/kg. The glass microspheres are incorporated to control glue line thickness.

This composition is applied to degreased, shot-blased mild steel plates and lap joints are prepared having an overlap area of 645 mm². Cure is effected at 200° C. for 5 minutes, after which the joints are allowed to cool to room temperature. The lap shear strength (average of 3 replicates) is 16.5 MPa.

EXAMPLE 2

Example 1 is repeated, replacing the dicyandiamide by isophthalic acid dihydrazide (25.2 parts). The average lap shear strength obtained is 15.3 MPa.

EXAMPLE 3

Example 1 is repeated, replacing the accelerator by Accelerator VI (4.6 parts). The average lap shear strength obtained is 16.8 MPa.

EXAMPLE 4

Example 1 is repeated, replacing the accelerator used in that Example by Accelerator VII (2.1 parts) and effecting cure at 180° C. for 10 minutes. The average lap shear strength obtained is 17.0 MPa.

EXAMPLE 5

Example 4 is repeated, replacing the accelerator used in that Example by Accelerator X (4.0 parts). The average lap shear strength obtained is 17.1 MPa.

EXAMPLE 6

Example 4 is repeated, replacing the dicyandiamide by isophthalic acid dihydrazide (25.2 parts) and the accelerator by Accelerator IV (3.0 parts). The average lap shear strength obtained is 14.0 MPa.

EXAMPLE 7

Example 1 is repeated, replacing the accelerator used in that Example by Accelerator IX (3.2 parts). The average lap shear strength obtained is 16.0 MPa.

EXAMPLE 8

Example 1 is repeated, replacing the dicyandiamide by adipic acid dihydrazide (23.1 parts) and the accelerator used in that Example by Accelerator V (3.0 parts). The average lap shear strength obtained is 15.5 MPa.

EXAMPLE 9

Example 8 is repeated, replacing the accelerator used in that Example by Accelerator VIII (2.8 parts). The average lap shear strength obtained is 15.9 MPa.

What is claimed is:

1. A method of effecting adhesion between two surfaces selected from the group consisting of metals, reinforced plastics, glass, friction materials and ceramics, which comprises
   (i) applying to one or both surfaces a curable composition comprising
      (a) an epoxide resin
      (b) a nitrogen-containing latent curing agent for the epoxide resin and
      (c) as cure accelerator dispersed as a powder in a mixture of (a) and (b), a solid solution of a nitrogen base having a boiling point above 130° C. and a polymeric phenol which is a condensation product of a phenol with an aldehyde, said solid solution being prepared in the absence of an epoxy resin,
   (ii) placing the two surfaces together with the composition positioned therebetween to form an assembly, and
   (iii) heating the assembly until the composition solidifies.

2. A method as claimed in claim 1, wherein the epoxide resin (a) contains at least two groups of formula

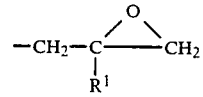

I directly attached to an atom or atoms of oxygen, nitrogen, or sulfur, where $R^1$ denotes a hydrogen atom or a methyl group.

3. A method as claimed in claim 2, wherein the epoxide resin (a) is a liquid and is a polyglycidyl ether, a polyglycidyl ester, a N,N'-diglycidylhydantoin, or a poly(N-glycidyl)derivative of an aromatic amine.

4. A method as claimed in claim 3, in which the epoxide resin (a) is a polyglycidyl ether of 2,2-bis(4-hydroxyphenyl)propane, of bis(4-hydroxyphenyl)methane, or of a novolak formed from formaldehyde and phenol, or phenol substituted in the ring by one chlorine atom or by one alkyl hydrocarbon group containing from one to nine carbon atoms, and having a 1,2-epoxide content of at least 0.5 equivalent per kilogram, bis(4-(diglycidylamino)phenyl)methane, or p-(diglycidylamino)phenyl)glycidyl ether.

5. A method as claimed in claim 1, in which the curing agent (b) is a boron trichloride/amine or boron trifluoride/amine complex, dicyandiamide, melamine, diallylmelamine, a guanamine, an aminotriazole, a hydrazide, semicarbazole, cyanoacetamide, or an aromatic polyamine.

6. A method as claimed in claim 5, in which the curing agent (b) is dicyandiamide, isophthalic acid dihydrazide or adipic acid dihydrazide.

7. A method as claimed in claim 1, in which the solid solution (c) is of a nitrogen base and, as polymeric phenol, a novolak prepared from a phenol and an aldehyde.

8. A method as claimed in claim 7, wherein the novolak has the general formula

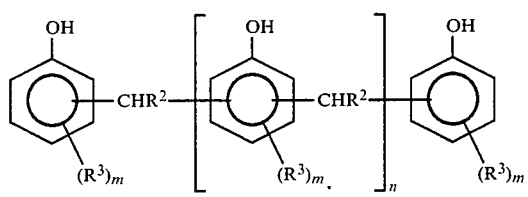

where
R$^2$ represents a hydrogen atom or an alkyl, aryl, or heterocyclyl group,
R$^3$ represents a halogen atom or a hydroxyl, alkyl, alkoxy, aryl, aralkyl, or hydroxyaralkyl group,
m represents zero or an integer of from 1 to 3, and n represents an integer having an average value that is within the range 1 to 15.

9. A method as claimed in claim 8, wherein

R$^2$ represents hydrogen,
R$^3$ represents alkyl or hydroxyaralkyl, and
m represents zero or 1.

10. A method as claimed in claim 1, wherein the nitrogen base in the solid solution (c) is a tertiary monoamine, secondary monoamine, primary diamine, secondary diamine, tertiary diamine, tertiary triamine, mixed polyamine, or nitrogen heterocycle.

11. A method according to claim 10, in which the nitrogen base has a boiling point above 150° C.

12. A method as claimed in claim 11, in which the nitrogen base is benzyldimethylamine, 2-(dimethylaminomethyl)phenol, 2,4,6-tris(dimethylaminomethyl)phenol, 2-methylimidazole, benzimidazole, 2-phenylimidazole or N-(2-aminoethyl)piperazine.

13. A method as claimed in claim 1, in which the weight ratio of polymeric phenol to nitrogen base in the solid solution (c) is within the range 0.8–4.0:1.

14. A method as claimed in claim 13, in which the weight ratio of polymeric phenol to nitrogen base is within the range 1.0–3.0:1.

15. A method according to claim 1, in which the two surfaces are of metal.

16. A method as claimed in claim 1, in which there is used 1 to 30 parts by weight of the curing agent (b) per 100 parts by weight of the epoxide resin (a).

17. A method as claimed in claim 1, in which there is used 0.1 to 10% of the accelerator (c) by weight of the epoxide resin (a).

18. A method as claimed in claim 1, wherein the assembly is heated to a temperature within the range 150°–220° C.

19. A method as claimed in claim 18, wherein the assembly is heated to a temperature within the range 175°–200° C.

20. A bonded assembly comprising two surfaces selected from the group consisting of metals, reinforced plastics, glass, friction materials and ceramics adhered together by a composition comprising
(a) an epoxide resin,
(b) a nitrogen-containing latent curing agent for the epoxide resin and
(c) as cure accelerator dispersed as a powder in a mixture of (a) and (b), a solid solution of a nitrogen base having a boiling point above 130° C. and a polymeric phenol which is a condensation product of a phenol with an aldehyde, said solid solution being prepared in the absence of an epoxy resin, said composition being heat-cured.

* * * * *